(12) United States Patent
Deno et al.

(10) Patent No.: US 12,465,225 B2
(45) Date of Patent: Nov. 11, 2025

(54) MEASUREMENT DEVICE

(71) Applicant: OMRON HEALTHCARE Co., Ltd., Kyoto (JP)

(72) Inventors: Toru Deno, Kyoto (JP); Takahiro Hamaguchi, Kyoto (JP); Masahiko Yumoto, Kyoto (JP); Takanobu Yamauchi, Kyoto (JP); Yasushi Matsuoka, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 875 days.

(21) Appl. No.: 17/175,863

(22) Filed: Feb. 15, 2021

(65) Prior Publication Data

US 2021/0177274 A1 Jun. 17, 2021

Related U.S. Application Data

(63) Continuation of application No. PCT/JP2019/029024, filed on Jul. 24, 2019.

(30) Foreign Application Priority Data

Aug. 21, 2018 (JP) .................... 2018-154490

(51) Int. Cl.
*A61B 5/022* (2006.01)
*A61B 5/11* (2006.01)
(Continued)

(52) U.S. Cl.
CPC ........... *A61B 5/022* (2013.01); *A61B 5/1116* (2013.01); *A61B 5/150816* (2013.01); *A61B 5/28* (2021.01); *A61B 5/318* (2021.01)

(58) Field of Classification Search
None
See application file for complete search history.

(56) References Cited

U.S. PATENT DOCUMENTS

2006/0020216 A1    1/2006  Oishi et al.
2006/0264771 A1*  11/2006  Lin ...................... A61B 5/0245
                                                              600/513
(Continued)

FOREIGN PATENT DOCUMENTS

CN   102245087 A   11/2011
EP      1618842 A1   1/2006
(Continued)

OTHER PUBLICATIONS

International Preliminary Report on Patentability issued Feb. 25, 2021 in International (PCT) Application No. PCT/JP2019/029024.

*Primary Examiner* — Benjamin S Melhus
(74) *Attorney, Agent, or Firm* — Wenderoth, Lind & Ponack, L.L.P.

(57) ABSTRACT

A measurement device according to an aspect includes a belt portion configured to be wrapped around a target measurement site of a user, an electrocardiogram measurement unit provided in the belt portion and configured to measure an electrocardiogram reading of the user, a blood pressure measurement unit provided in the belt portion and configured to measure blood pressure of the user, a measurement end detection unit configured to detect an end of the electrocardiogram measurement by the electrocardiogram measurement unit, and a blood pressure measurement control unit configured to start blood pressure measurement by the blood pressure measurement unit in response to the measurement end detection unit that has detected the end of the electrocardiogram measurement.

6 Claims, 11 Drawing Sheets

(51) Int. Cl.
*A61B 5/15* (2006.01)
*A61B 5/28* (2021.01)
*A61B 5/318* (2021.01)

(56) References Cited

U.S. PATENT DOCUMENTS

| | | | |
|---|---|---|---|
| 2007/0021680 A1* | 1/2007 | Mills | A61B 5/03 |
| | | | 600/521 |
| 2011/0009718 A1* | 1/2011 | Gavish | A61B 5/021 |
| | | | 600/437 |
| 2011/0237963 A1 | 9/2011 | Nishioka et al. | |
| 2016/0287095 A1 | 10/2016 | Gu | |
| 2017/0042433 A1* | 2/2017 | Noh | A61B 5/14542 |
| 2018/0333056 A1* | 11/2018 | Chou | A61B 5/02438 |
| 2018/0344193 A1* | 12/2018 | Gui | A61B 5/282 |
| 2019/0175033 A1* | 6/2019 | Shimuta | A61B 5/7239 |
| 2020/0205678 A1* | 7/2020 | Kawabata | A61B 5/0022 |

FOREIGN PATENT DOCUMENTS

| | | |
|---|---|---|
| JP | 7-116130 A | 5/1995 |
| JP | 2004-65336 A | 3/2004 |
| JP | 2006-26210 A | 2/2006 |
| JP | 2010-131305 A | 6/2010 |
| JP | 2011-200376 A | 10/2011 |
| JP | 2016-195747 A | 11/2016 |
| JP | 2017-6230 A | 1/2017 |

* cited by examiner

[FIG. 1]
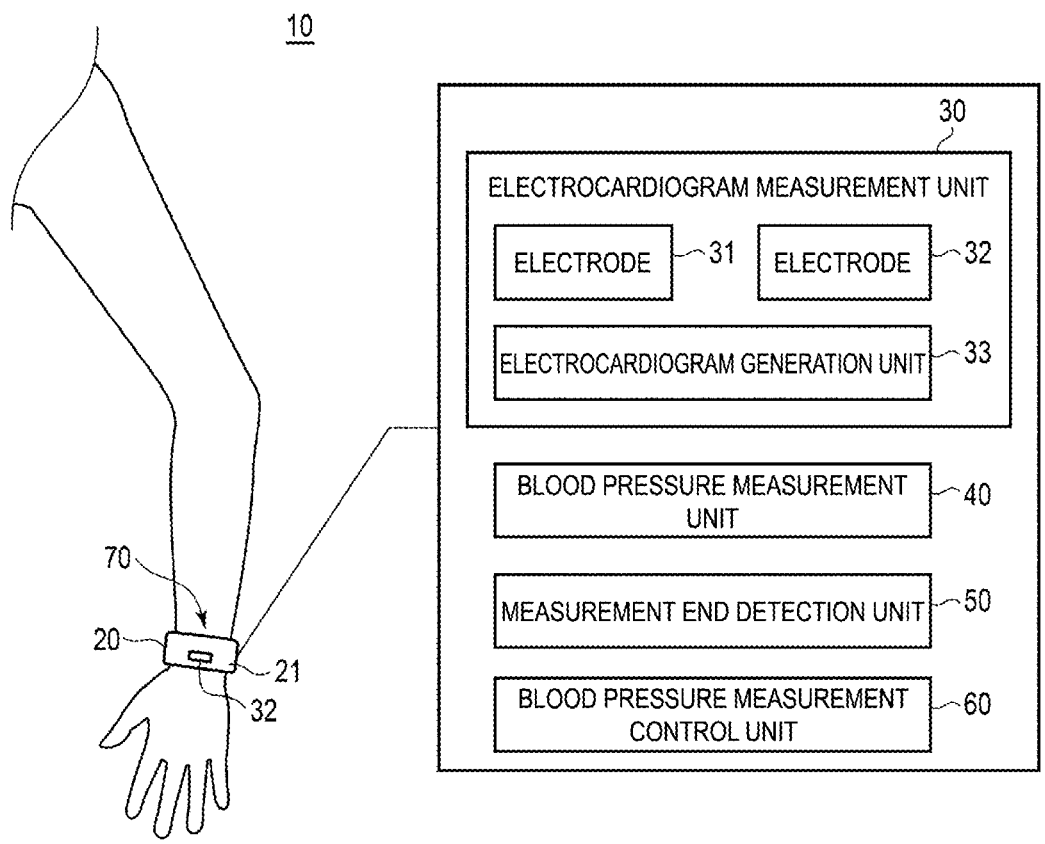

[FIG. 2]
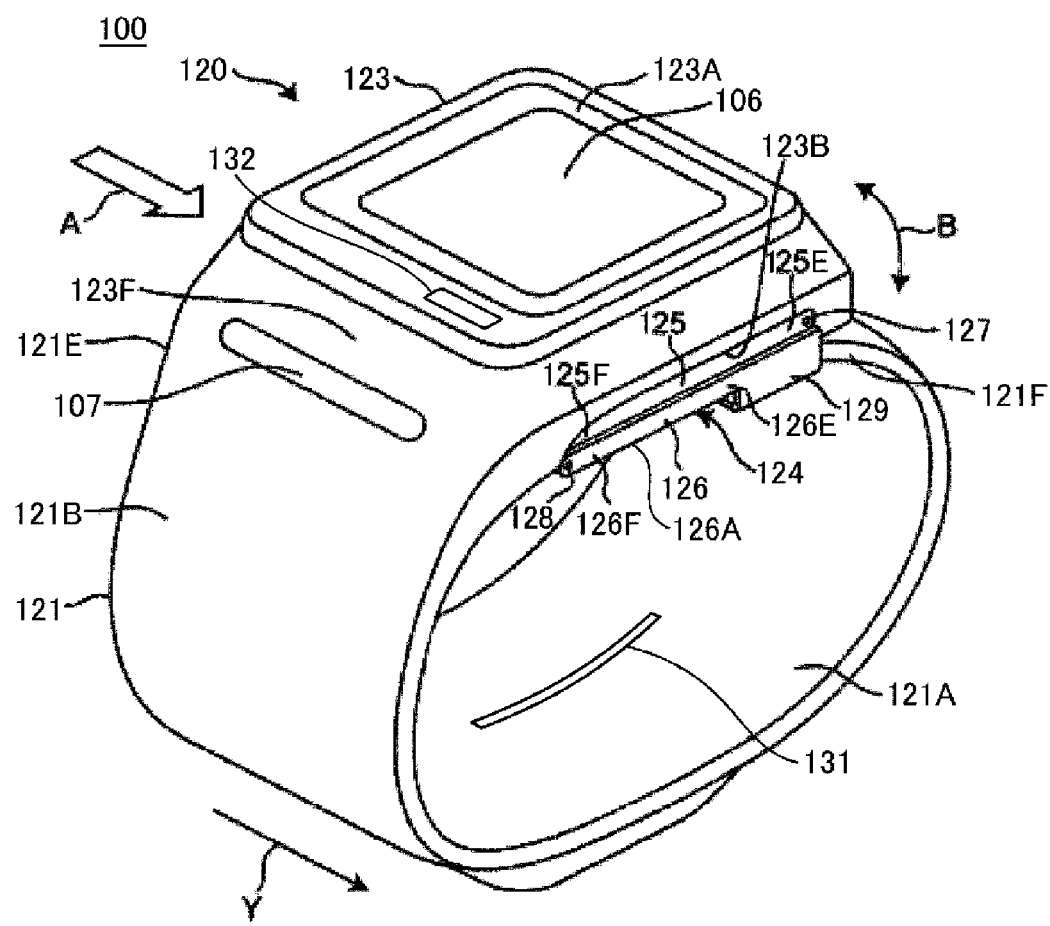

[FIG. 3]
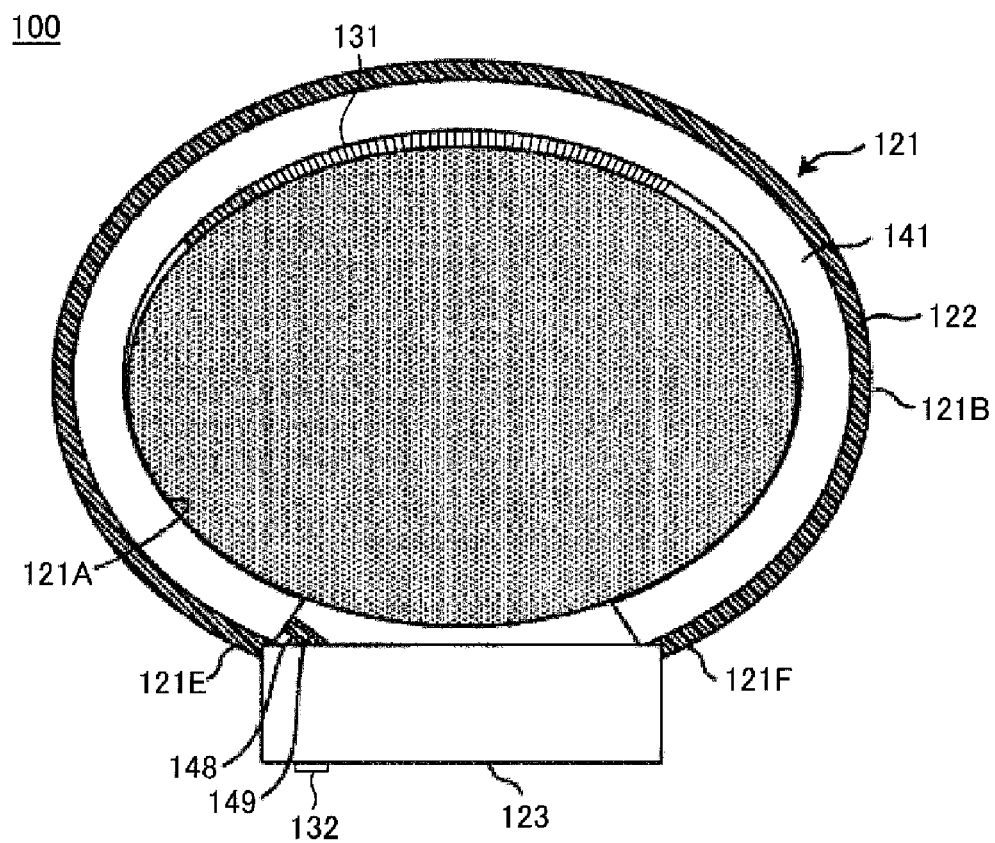

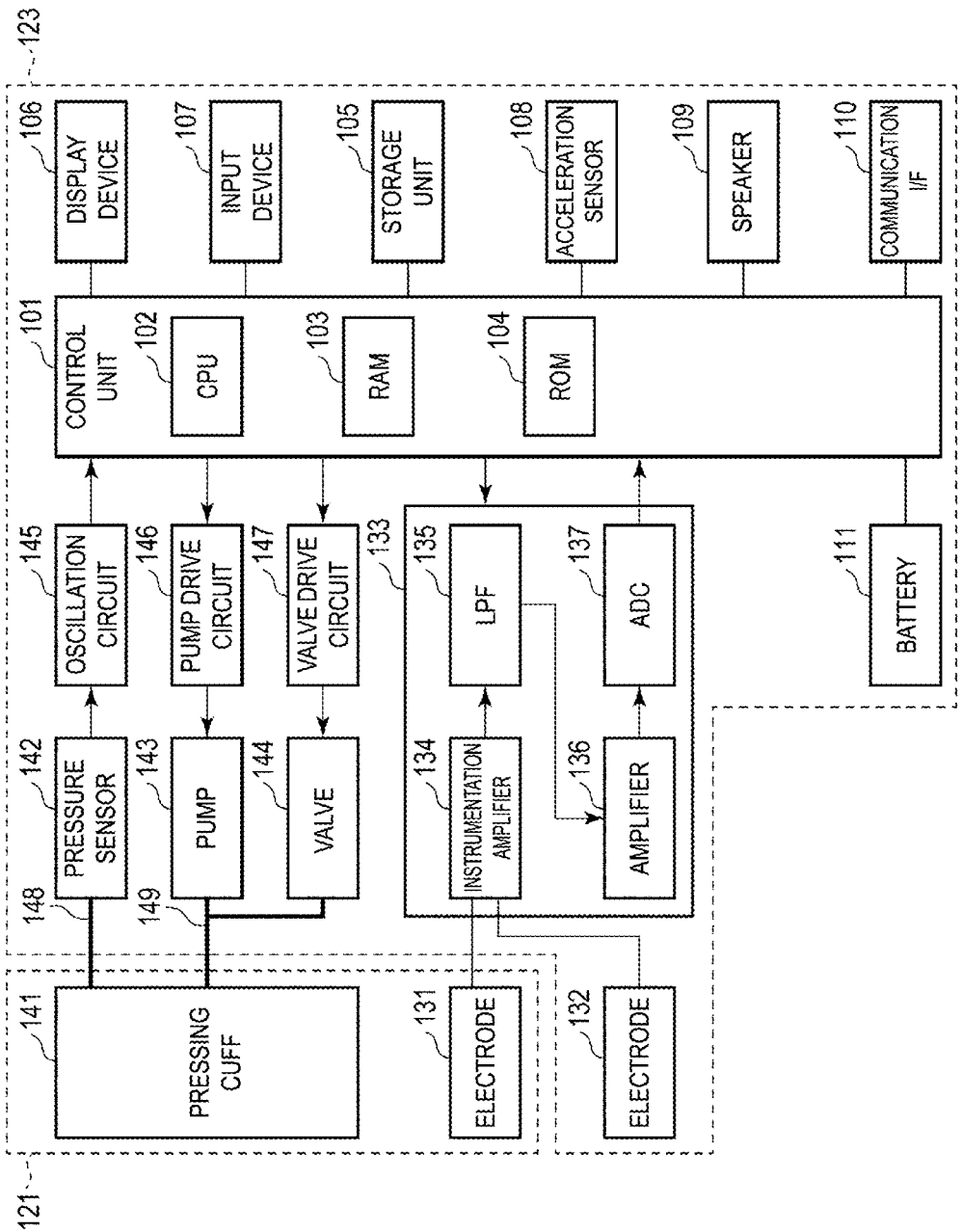

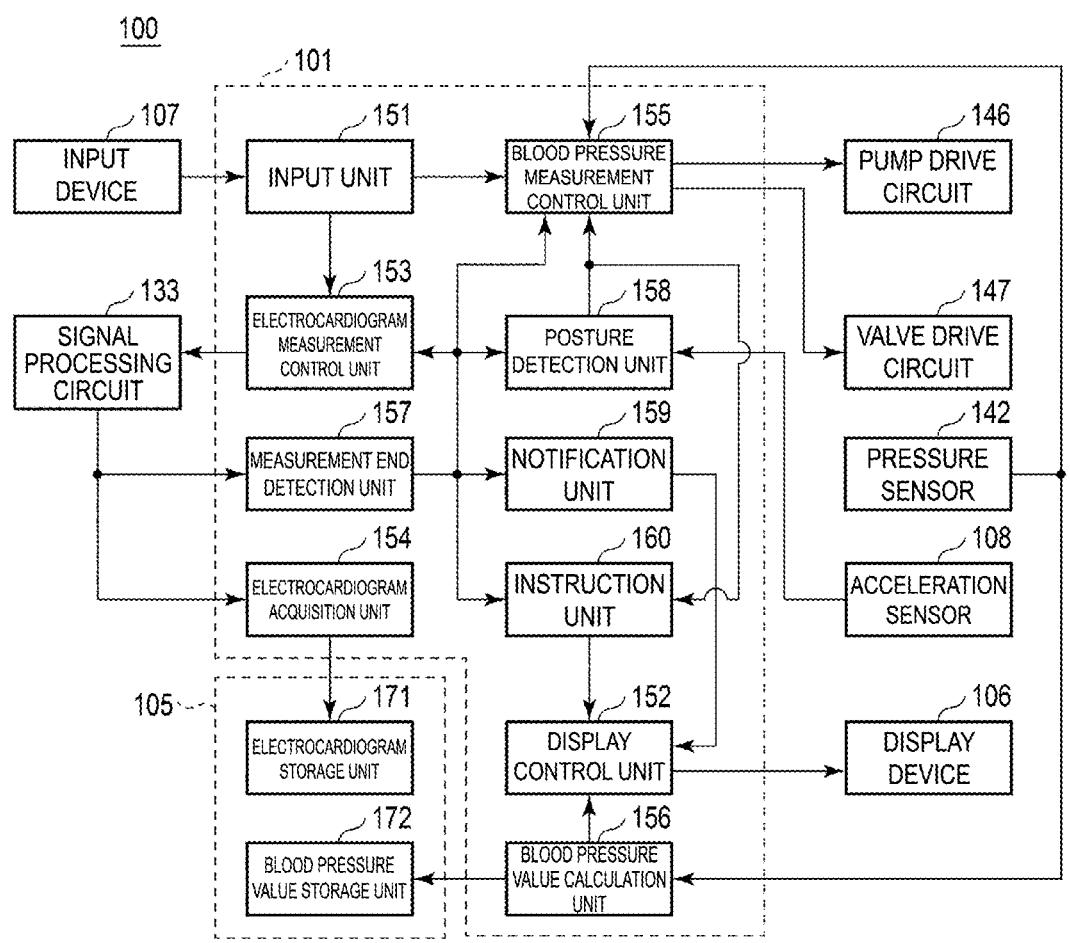
[FIG. 5]

[FIG. 6]
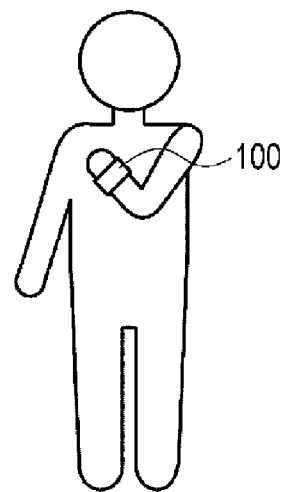

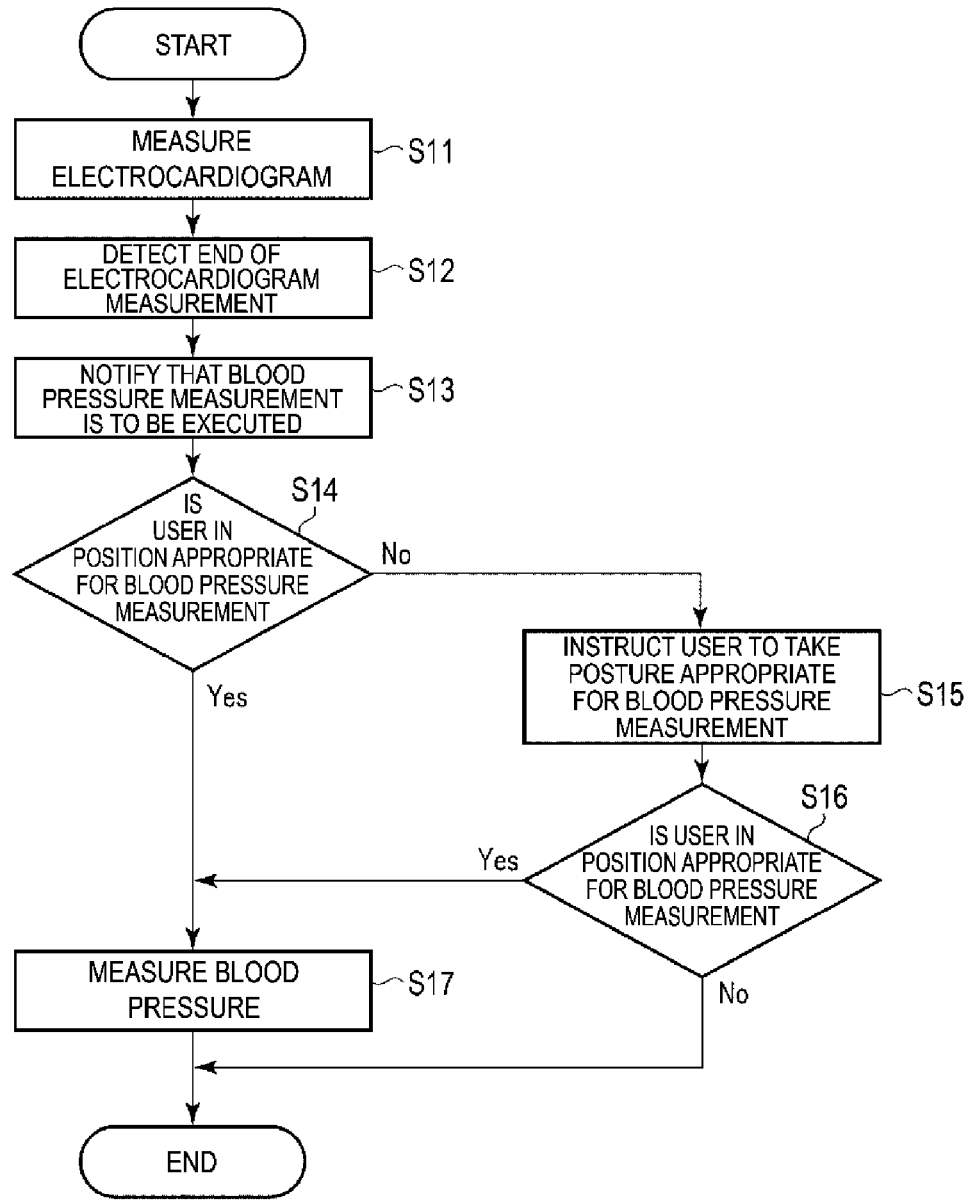

[FIG. 8]
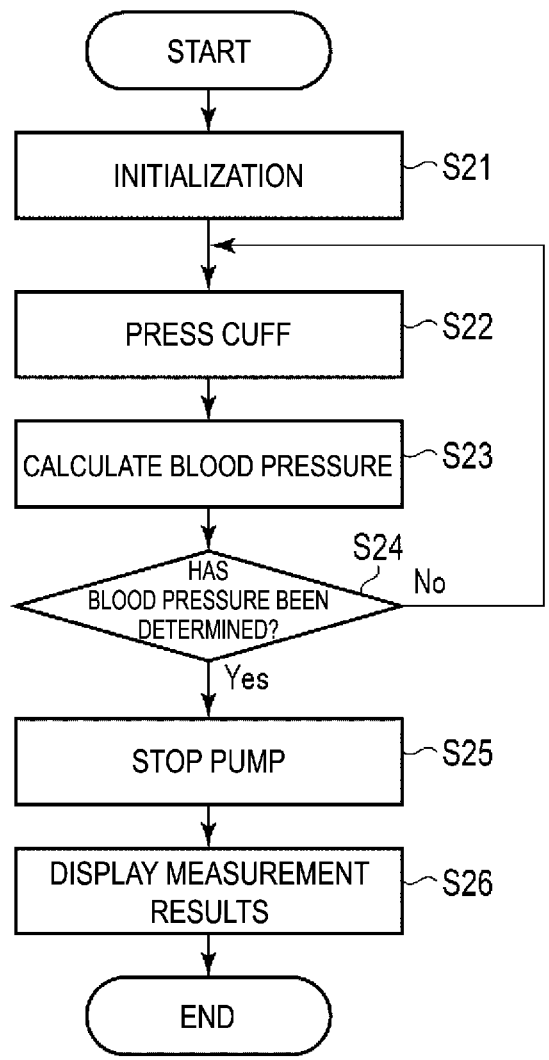

[FIG. 9]
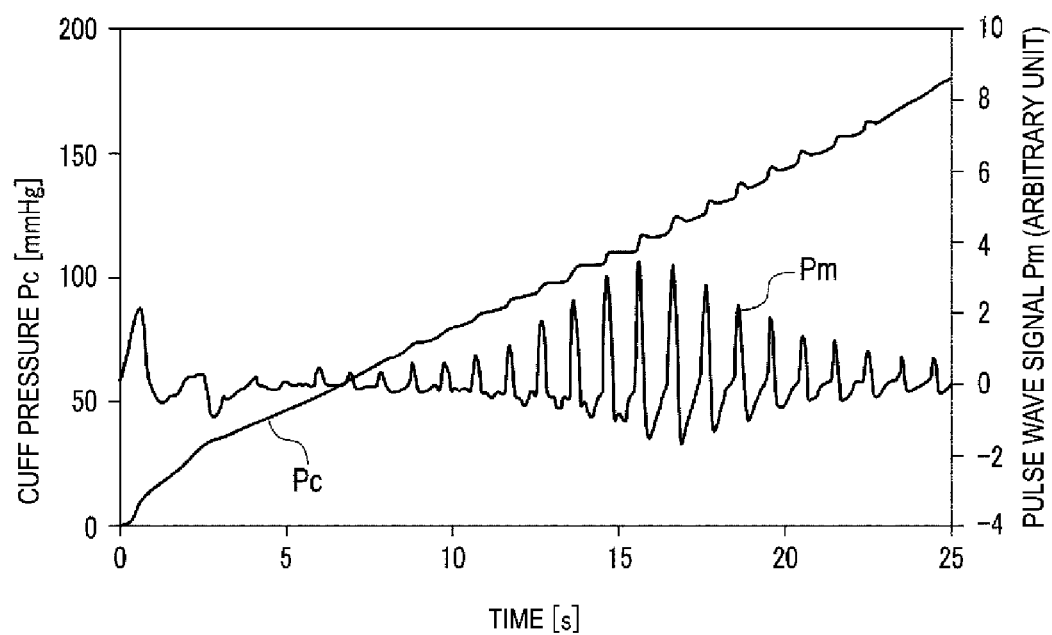

[FIG. 10]
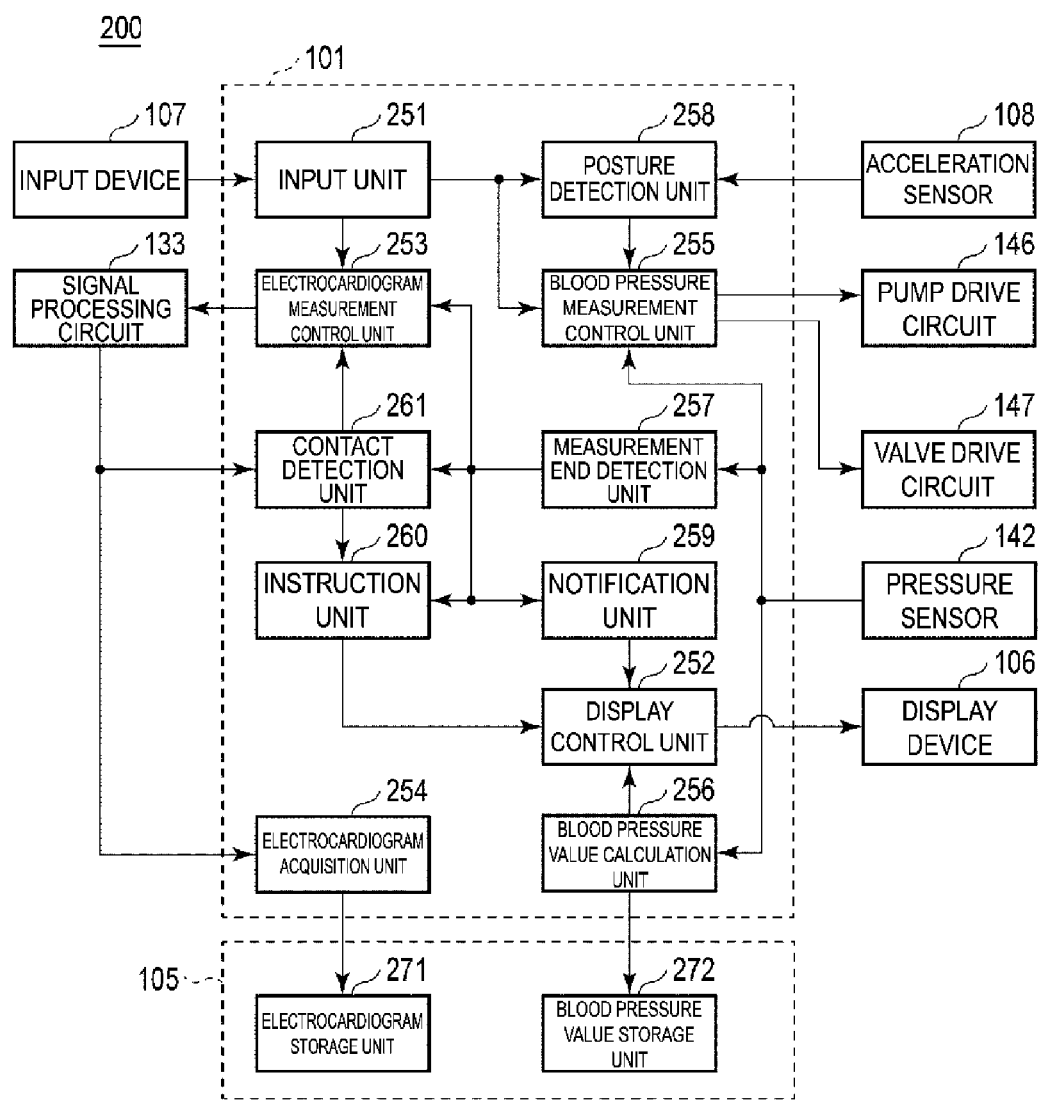

[FIG. 11]
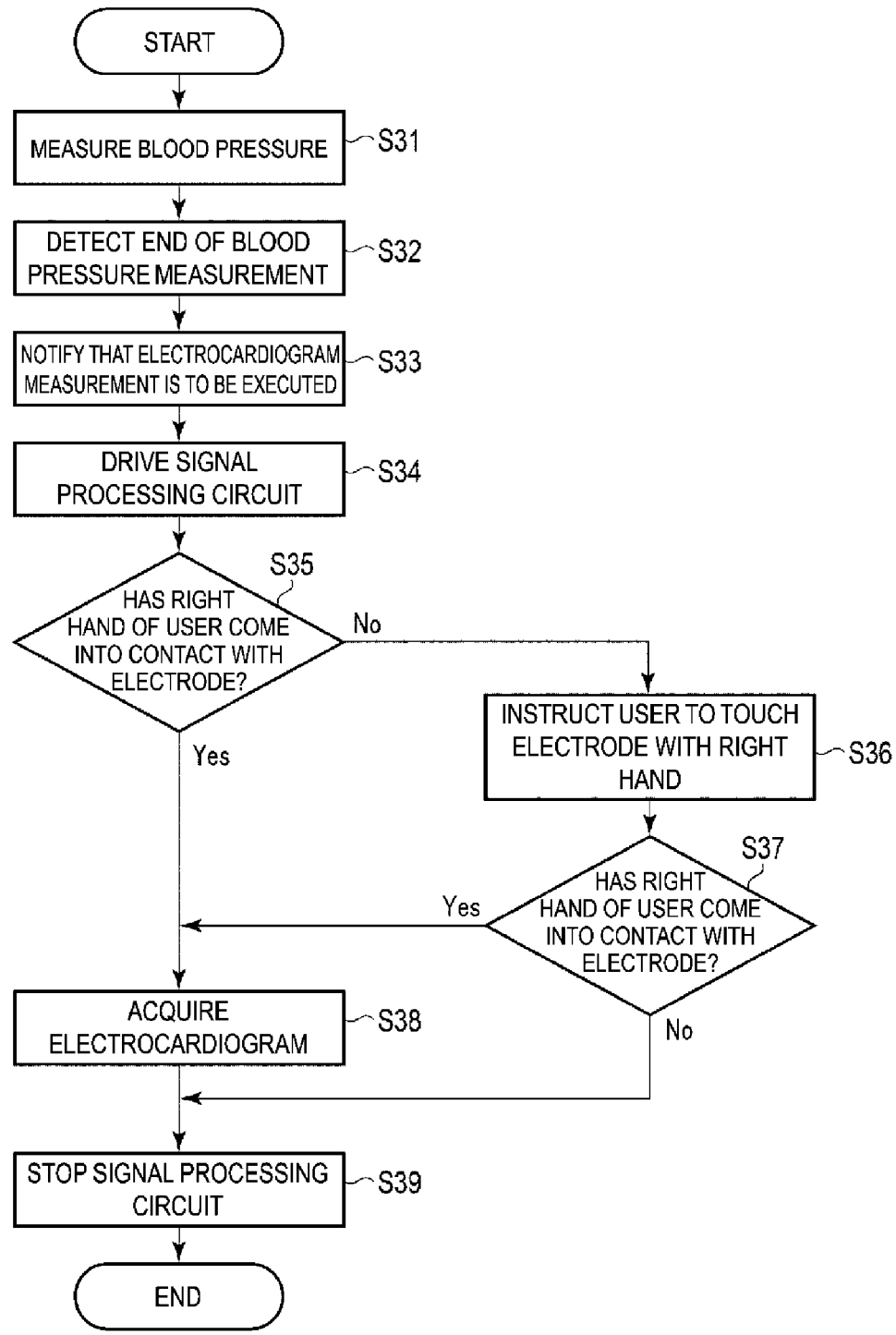

MEASUREMENT DEVICE

CROSS-REFERENCE TO RELATED APPLICATIONS

This application is the U.S. national stage application filed pursuant to 35 U.S.C. 365(c) and 120 as a continuation of International Patent Application No. PCT/JP2019/029024, filed Jul. 24, 2019, which application claims priority from Japanese Patent Application No. 2018-154490, filed Aug. 21, 2018, which applications are incorporated herein by reference in their entireties.

TECHNICAL FIELD

Aspects of the present invention relate to, for example, a measurement device configured to measure an electrocardiogram reading and blood pressure of a user.

BACKGROUND ART

For example, for diagnosis or treatment of a cardiovascular disease, a patient may be required by a physician to periodically measure an electrocardiogram readings and blood pressure at home (for example, after wake-up and before bedtime on a daily basis). It is important to remember to measure an electrocardiogram reading and blood pressure, and a patient uses a schedule management application installed in a user terminal device such as a smartphone to output an alert at time for measurement. Additionally, there is a measurement device such as a blood pressure monitor including an alert function to output an alert at time for measurement (see Patent Document 1, for example).

CITATION LIST

Patent Literature

Patent Document 1: JP 2006-26210 A

SUMMARY OF INVENTION

Technical Problem

In the case described above, despite measuring one of an electrocardiogram reading and blood pressure in response to the alert, a patient may forget to measure either electrocardiogram readings or blood pressure.

In view of the above-described circumstances, an object of the present invention is to provide a measurement device that can prevent a user from forgetting, after measuring one of an electrocardiogram reading and blood pressure, to measure the other of an electrocardiogram reading and blood pressure.

Solution to Problem

The present invention adopts the following configurations to solve the above-described problems.

A measurement device according to an aspect includes an electrocardiogram measurement unit configured to measure an electrocardiogram reading of a user, a blood pressure measurement unit configured to measure blood pressure of the user, a measurement end detection unit configured to detect an end of electrocardiogram measurement by the electrocardiogram measurement unit, a notification unit configured to output a message notifying that the blood pressure measurement is to be performed, in response to the measurement end detection unit that has detected the end of the electrocardiogram measurement, and a blood pressure measurement control unit configured to start blood pressure measurement by the blood pressure measurement unit in response to the measurement end detection unit that has detected the end of the electrocardiogram measurement.

According to the above-described configuration, the blood pressure measurement starts after the end of the electrocardiogram measurement without the user instructing the start of the blood pressure measurement. Thus, the user can be prevented from forgetting to perform the blood pressure measurement after the electrocardiogram measurement. Further, the measurement device can independently measure both an electrocardiogram and blood pressure, and is thus highly convenient for the user.

In the aspect described above, the measurement device includes a notification unit configured to notify that the blood pressure measurement is to be performed, in response to the measurement end detection unit that has detected the end of the electrocardiogram measurement.

According to the above-described configuration, the user can recognize the start of the blood pressure measurement and prepare for the blood pressure measurement. For example, in response to the notification, the user takes posture appropriate for the blood pressure measurement.

In an aspect, the measurement device may further include a posture detection unit configured to detect that the user is in posture appropriate for the blood pressure measurement, and the blood pressure measurement control unit starts the blood pressure measurement in response to the measurement end detection unit that has detected the end of the electrocardiogram measurement and the posture detection unit that has detected that the user is in posture appropriate for the blood pressure measurement.

According to the above-described configuration, the blood pressure measurement can be performed while the user is in posture appropriate for the blood pressure measurement. As a result, a highly reliable blood pressure measurement value can be obtained.

In an aspect, the measurement device may further include an instruction unit configured to instruct the user to assume posture appropriate for the blood pressure measurement, when the posture detection unit does not detect that the user is in posture appropriate for the blood pressure measurement, before a predetermined period of time has elapsed since the end of the electrocardiogram measurement.

According to the above-described configuration, the user can more securely perform the blood pressure measurement in a state where the user is in posture appropriate for the blood pressure measurement. As a result, a highly reliable blood pressure measurement value can be obtained more securely.

A measurement device according to an aspect includes an electrocardiogram measurement unit configured to measure an electrocardiogram reading of a user, a blood pressure measurement unit configured to measure blood pressure of the user, a measurement end detection unit configured to detect an end of blood pressure measurement by the blood pressure measurement unit, a notification unit configured to output a message notifying that the electrocardiogram measurement is to be performed, in response to the measurement end detection unit that has detected the end of the blood pressure measurement, and an electrocardiogram measurement control unit configured to start electrocardiogram measurement by the electrocardiogram measurement unit in response to the measurement end detection unit that has detected the end of the blood pressure measurement.

According to the above-described configuration, the electrocardiogram measurement starts after the end of the blood pressure measurement, without the user instructing the start of the electrocardiogram measurement. Thus, the user can be prevented from forgetting to perform the electrocardiogram measurement after the blood pressure measurement. Further, the measurement device can independently measure both an electrocardiogram and blood pressure, and is thus highly convenient for the user.

In the aspect described above, the measurement device includes a notification unit configured to notify that the electrocardiogram measurement is to be performed, in response to the measurement end detection unit that has detected the end of the blood pressure measurement.

According to the above-described configuration, the user can recognize the start of the electrocardiogram measurement and prepare for the electrocardiogram measurement. For example, in response to the notification, the user brings a hand that is not attached to the measurement device into contact with an electrode for the electrocardiogram measurement.

In an aspect, the measurement device may further include an attachment member configured to be attached to the user, and the electrocardiogram measurement unit includes a first electrode provided in a surface of a side that comes into contact with the user of the attachment member, a second electrode provided in a surface of a side that does not come into contact with the user of the attachment member, and an electrocardiogram generation unit configured to generate the electrocardiogram based on a potential difference between the first electrode and the second electrode, and the measurement device further includes a contact detection unit configured to detect contact of the user with the second electrode, and an instruction unit configured to instruct the user to come into contact with the second electrode, when the contact detection unit does not detect the contact of the user with the second electrode, before a predetermined time period has elapsed since the end of the blood pressure measurement.

According to the above-described configuration, the electrocardiogram measurement can be performed more securely.

Advantageous Effects of Invention

According to the present invention, a measurement device that can prevent a user from forgetting, after measuring one of an electrocardiogram and blood pressure, to measure the other of an electrocardiogram and blood pressure.

BRIEF DESCRIPTION OF DRAWINGS

FIG. 1 is a view illustrating a measurement device according to an embodiment.

FIG. 2 is a perspective view illustrating appearance of a measurement device according to a first embodiment.

FIG. 3 is a cross-sectional view of the measurement device according to the first embodiment.

FIG. 4 is a view illustrating a hardware configuration of a control system of the measurement device according to the first embodiment.

FIG. 5 is a view illustrating a software configuration of the measurement device according to the first embodiment.

FIG. 6 is a view illustrating posture appropriate for pressure measurement.

FIG. 7 is a flowchart illustrating a processing procedure of performing blood pressure measurement after electrocardiogram measurement according to the first embodiment.

FIG. 8 is a flowchart illustrating a processing procedure of blood pressure measurement by an oscillometric method according to the first embodiment.

FIG. 9 is a view illustrating relationship between cuff pressure and a pulse wave signal in blood pressure measurement by the oscillometric method.

FIG. 10 is a view illustrating a software configuration of a measurement device according to a second embodiment.

FIG. 11 is a flowchart illustrating a processing procedure of performing electrocardiogram measurement after blood pressure measurement according to the second embodiment.

DESCRIPTION OF EMBODIMENTS

Hereinafter, embodiments of the present invention will be described with reference to the drawings.

Application Example

With reference to FIG. 1, an example of a scene where the present invention is applied will be described. FIG. 1 illustrates a measurement device 10 according to an embodiment. The measurement device 10 is a wearable device and is attached to the left wrist of a user in the example of FIG. 1. The measurement device 10 includes a belt portion 20, an electrocardiogram measurement unit 30, a blood pressure measurement unit 40, a measurement end detection unit 50, and a blood pressure measurement control unit 60.

The belt portion 20 is a member wrapped around a left wrist 70 of the user and is used to attach the measurement device 10 to the left wrist 70 of the user. The belt portion 20 includes an inner circumferential surface and an outer circumferential surface 21. The inner circumferential surface refers to a portion of a front surface of the belt portion 20 that faces the left wrist 70 of the user in a state where the measurement device 10 is attached to the left wrist 70 of the user. The outer circumferential surface 21 refers to a portion of the front surface of the belt portion 20 other than the inner circumferential surface. In other words, the inner circumferential surface is a surface of a side that comes into contact with the user in a state where the measurement device 10 is attached to the left wrist 70 of the user, and the outer circumferential surface 21 is a surface of a side that does not come into contact with the user in a state where the measurement device 10 is attached to the left wrist 70 of the user. The belt portion 20 is an example of an attachment member attached to the user.

The electrocardiogram measurement unit 30 is provided in the belt portion 20, and measures an electrocardiogram of the user. The electrocardiogram is a waveform signal that represents electrical activity of a heart of the user. In the present embodiment, the electrocardiogram measurement unit 30 uses an induction method referred to as first induction. That is, the electrocardiogram measurement unit 30 measures an electrocardiogram based on a potential difference occurring between both upper limbs. The electrocardiogram measurement unit 30 includes an electrode 31, an electrode 32, and an electrocardiogram generation unit 33. The electrode 31 is provided in the inner circumferential surface of the belt portion 20 and comes into contact with the left wrist 70 of the user in a state where the measurement device 10 is attached to the left wrist 70 of the user. The electrode 32 is provided in the outer circumferential surface 21 of the belt portion 20 and does not come into contact with the left wrist 70 of the user in a state where the measurement device 10 is attached to the left wrist 70 of the user. In measuring an electrocardiogram, the user touches the electrode 32 with a right hand (for example, an index finger of the right hand). Accordingly, a state where the electrode 31 is disposed in a left upper limb of the user and the electrode 32 is disposed in a right upper limb of the user is generated. The electrocardiogram generation unit 33 generates an electrocardiogram based on a potential difference between the electrode 31 and the electrode 32.

The blood pressure measurement unit 40 is provided in the belt portion 20 and measures blood pressure of the user. The blood pressure measurement unit 40 includes a pressing cuff that presses the left wrist 70 based on supply of air, and performs blood pressure measurement based on the oscillometric method or the Korotkoff method.

The measurement end detection unit 50 detects the end of measurement by the electrocardiogram measurement unit 30. For diagnosis or treatment of a cardiovascular disease, data of an electrocardiogram for a predetermined period of time (for example, 30 seconds) may be required. The measurement end detection unit 50 determines the end of the measurement by the electrocardiogram measurement unit 30 when data of an electrocardiogram for a predetermined period of time is acquired. In other words, the measurement end detection unit 50 determines the end of the measurement by the electrocardiogram measurement unit 30 when a predetermined period of time has elapsed since the contact of the right hand of the user with the electrode 32.

The blood pressure measurement control unit 60 controls the blood pressure measurement unit 40. The blood pressure measurement control unit 60 starts measurement by the blood pressure measurement unit 40 in response to the measurement end detection unit 50 that has detected the end of the measurement by the electrocardiogram measurement unit 30.

In the measurement device 10 including the configuration described above, after electrocardiogram measurement, blood pressure measurement is performed without the user inputting, to the measurement device 10, an instruction to measure blood pressure. Accordingly, the user is prevented from forgetting to measure blood pressure after electrocardiogram measurement. Further, the measurement device 10 can independently measure both an electrocardiogram and blood pressure, and is thus highly convenient for the user.

Note that the measurement device 10 may be configured to perform electrocardiogram measurement after blood pressure measurement. Additionally, the measurement device 10 may be configured such that operating modes can be switched among an operating mode in which blood pressure measurement is performed after electrocardiogram measurement, an operating mode in which electrocardiogram measurement is performed after blood pressure measurement, an operating mode in which electrocardiogram measurement is performed, and an operating mode in which blood pressure measurement is performed.

Hereinafter, a measurement device according to an embodiment will be described in detail. A first embodiment relates to a measurement device configured to perform blood pressure measurement after electrocardiogram measurement, and a second embodiment relates to a measurement device configured to perform electrocardiogram measurement after blood pressure measurement.

First Embodiment

Configuration Example

Hardware Configuration

An example of a hardware configuration of a measurement device 100 according to the first embodiment will be described with reference to FIGS. 2 to 4.

FIG. 2 is a perspective view illustrating appearance of the measurement device 100. As illustrated in FIG. 2, the measurement device 100 is a wristwatch device. The measurement device 100 is designed to be attached to a left wrist of a user. The measurement device 100 includes a belt portion 120, a display device 106, an input device 107, an electrode 131, and an electrode 132. The belt portion 120 includes a belt 121, a body 123, and a three fold buckle 124.

The belt 121 refers to a band-like member wrapped around and attached to the left wrist of the user and may also be referred to as another name such as a "band." The belt 121 includes an inner circumferential surface 121A and an outer circumferential surface 121B. The inner circumferential surface 121A is a front surface that faces the left wrist of the user in a state where the measurement device 100 is attached to the user (hereinafter, simply referred to as an "attachment state"), and the outer circumferential surface 121B is a front surface opposite to the inner circumferential surface 121A. The width of the belt 121 is set to approximately 30 mm in this example. The width is a dimension in the width direction of the belt 121. The width direction of the belt 121 corresponds to the longitudinal direction of the left wrist indicated by an arrow Y.

The body 123 is integrally molded at an end portion 121E in the circumferential direction of the belt 121. Note that the belt 121 and the body 123 may be formed separately, and the body 123 may be attached to the belt 121 by an engagement member (for example, a hinge). In this example, a portion of the belt 121 in which the body 123 is disposed is expected to be positioned in a surface of a back side of the left wrist in the attachment state. The body 123 is formed to be thin and compact not to interfere with daily activity of the user. In this example, the body 123 has a profile of a truncated quadrangular pyramid shape protruding outward from the belt 121.

The display device 106 is provided in a top surface 123A of the body 123. The input device 107 is provided along a side surface 123F of the body 123. The display device 106 and the input device 107 will be described below.

A bottom surface 123B of the body 123 is connected to the other end portion 121F in the circumferential direction of the belt 121 by the buckle 124. The buckle 124 includes a first plate-like member 125, a second plate-like member 126, a connecting rod 127, a connecting rod 128, and a fixing portion 129. The second plate-like member 126 is disposed in an inner circumferential side with respect to the first plate-like member 125. One end portion 125E of the first plate-like member 25 is freely rotatably attached to the body 123 via the connecting rod 127 extending along the width direction of the belt 121. The other end portion 125F of the first plate-like member 125 is freely rotatably attached to one end portion 126F of the second plate-like member 126 via the connecting rod 128 extending along the width direction of the belt 121. The other end portion 126E of the second plate-like member 126 is fixed to the end portion 121F of the belt 121 by the fixing portion 129. Note that an attachment position of the fixing portion 129 with respect to the circumferential direction of the belt 121 is variably set in advance in accordance with the circumferential length of the left wrist of the user. Accordingly, the belt 121 is generally constituted in a substantially annular shape, and the bottom surface 123B of the body 123 and the end portion 121F of the belt 121 can be opened and closed in a direction indicated by an arrow B by the buckle 124.

The electrode 131 is provided in the inner circumferential surface 121A of the belt 121 between the end portion 121E and the end portion 121F of the belt 121. The electrode 131 has, for example, a plate-like shape or a sheet-like shape. In this example, the electrode 131 has a shape that is long in the circumferential direction of the belt 121. Accordingly, the electrode 131 securely comes into contact with the left wrist of the user in the attachment state. Note that the electrode 131 may be disposed in an inner circumferential surface 126A of the second plate-like member 126 of the buckle 124.

The electrode 132 is provided in the top surface 123A of the body 123. Accordingly, the electrode 132 does not come into contact with the left wrist of the user in the attachment state. Note that the electrode 132 may be provided in the outer circumferential surface 121B of the belt 121.

When the measurement device 100 is attached to the left wrist of the user, the user passes a left hand through the belt 121 in a direction indicated by an arrow A, in a state where the buckle 124 is opened to increase the diameter of a ring of the belt 121. In a state where the body 123 is positioned in the surface of the back side of the left wrist, the user closes and fixes the buckle 124. In this way, the user attaches the measurement device 100 to the left wrist.

FIG. 3 illustrates a cross-section of the measurement device 100 in the attachment state. As illustrated in FIG. 3, the belt 121 includes a band-like body 122 and a pressing cuff 141 attached along an inner circumferential surface of the band-like body 122. In this example, the band-like body 122 is formed of a plastic material, and has flexibility with respect to the thickness direction, and is substantially non-stretchable with respect to the circumferential direction. In this example, the pressing cuff 141 is constituted as a fluid bag by causing two stretchable polyurethane sheets to face each other in the thickness direction and welding circumferential edges of the two stretchable polyurethane sheets. The electrode 131 is disposed in an inner circumferential surface of the pressing cuff 141. The inner circumferential surface of the pressing cuff 141 is the inner circumferential surface 121A of the belt 121.

FIG. 4 illustrates a hardware configuration of a control system of the measurement device 100. As illustrated in FIG. 4, in addition to the display device 106, the input device 107, and the electrode 132, the body 123 of the measurement device 100 is provided with a control unit 101, a storage unit 105, an acceleration sensor 108, a speaker 109, a communication interface 110, a battery 111, a signal processing circuit 133, a pressure sensor 142, a pump 143, a valve 144, an oscillation circuit 145, a pump drive circuit 146, and a valve drive circuit 147. The electrode 131 and the pressure cuff 141 are provided in the belt 121.

The control unit 101 includes a Central Processing Unit (CPU) 102, a Random Access Memory (RAM) 103, a Read Only Memory (ROM) 104, and the like and controls each component. For example, the storage unit 105 is an auxiliary storage device such as a semiconductor memory (for example, a flash memory), and non-transitorily stores a program executed by the control unit 101, settings data necessary for executing the program, measurement data of an electrocardiogram, measurement data of blood pressure, and the like. A storage medium provided in the storage unit 105 is a medium that accumulates information such as a recorded program by an electrical, magnetic, optical, mechanical, or chemical action such that a computer, other devices, a machine, or the like can read the information such as the recorded program. Note that at least a portion or all of the program may be stored in the ROM 104.

The display device 106 is controlled by the control unit 101 and displays information such as blood pressure measurement results. The display device 106 is an organic Electro-Luminescence (EL) display, for example. The organic EL display may also be referred to as an Organic Light Emitting Diode (OLED) display. Note that the display device 106 may be a display device of a different system, such as a liquid crystal display (LCD) device, for example.

The input device 107 enables the user to input an instruction to the measurement device 100. The input device 107 receives an operation by the user, for example, an operation corresponding to an instruction to start measurement. The input device 107 includes, for example, a plurality of push buttons. Note that the input device 107 may be a touch panel provided on a screen of the display device 106.

The acceleration sensor 108 is, for example, a triaxial acceleration sensor and outputs an acceleration signal representing acceleration in three directions orthogonal to one another. The speaker 109 is supplied with an audio signal from the control unit 101 and converts the audio signal into sound.

The communication interface 110 is an interface for communicating with an external device. The communication interface 110 includes, for example, a short-range wireless module such as a Bluetooth (trade name) module or a Bluetooth Low Energy (BLE) module and directly communicates with a terminal device (for example, a smartphone) possessed by the user. The communication interface 110 may include, instead of or in addition to the short-range wireless module, other wireless module such as a wireless Local Area Network (LAN) module. The communication interface 110 communicates with an external device via a communication network such as the Internet by using a wireless LAN module. Additionally, the communication unit 110 may include a terminal such as a micro Universal Serial Bus (USB) connector and may communicate with an external device via a cable such as a USB cable.

The battery 111 supplies power to each component housed in the body 123. The battery 111 is a rechargeable battery, for example.

The signal processing circuit 133 includes an instrumentation amplifier 134, a low pass filter (LPF) 135, an amplifier 136, and an analog-to-digital converter (ADC) 137. The instrumentation amplifier 134 includes two input terminals, and the electrode 131 and the electrode 132 are respectively connected to the input terminals. The instrumentation amplifier 134 differentially amplifies potential of the electrode 131 and potential of the electrode 132, and generates a potential difference signal in accordance with a potential difference between the electrode 131 and the electrode 132. The instrumentation amplifier 134 is an example of a potential difference signal generation unit that generates a potential difference signal representing a potential difference between the electrode 131 and the electrode 132. The potential difference signal is filtered by the LPF 135 and amplified by the amplifier 136 and converted to a digital signal by the ADC 137. The LPF 135 is an example of a filter for removing noise incorporated in a potential difference signal.

The control unit 101 acquires, as an electrocardiogram, a potential difference signal output from the signal processing circuit 133 by a time series.

The pump 143 and the valve 144 are connected to the pressing cuff 141 via a pipe 149, and the pressure sensor 142 is connected to the pressing cuff 141 via a pipe 148. Note that the pipes 148 and 149 may be a common single pipe. The pump 143 is, for example, a piezoelectric pump and supplies air as fluid to the pressing cuff 141 through the pipe 148 to increase pressure inside the pressing cuff 141. The pump drive circuit 146 is controlled by the control unit 101 and drives the pump 143. The valve drive circuit 147 is controlled by the control unit 101 and drives the valve 144. In a state where the valve 144 is opened, the pressing cuff 141 is in communication with atmosphere. The valve 144 includes a function of a check valve and prevents air from flowing into the pressing cuff 141 through the valve 144.

The pressure sensor 142 is, for example, a piezoresistive pressure sensor, detects pressure inside the pressing cuff 141 (hereinafter, also referred to as cuff pressure), and outputs an electrical signal representing the cuff pressure. The cuff pressure is, for example, pressure based on atmospheric pressure as a reference. The oscillation circuit 145 oscillates based on the electrical signal from the pressure sensor 142 and outputs, to the control unit 101, a frequency signal having a frequency in accordance with the electrical signal. An output of the pressure sensor 142 is used to control pressure of the pressing cuff 141 and to calculate a blood pressure value (including systolic blood pressure (SBP) and diastolic blood pressure (DBP)) by the oscillometric method.

Note that, with respect to a specific hardware configuration of the measurement device 100, a component can be omitted, replaced, or added as appropriate in accordance with embodiments. For example, the control unit 101 may include a plurality of processors. Additionally, instead of the acceleration sensor 108 or in addition to the acceleration sensor 108, the measurement device 100 may include an angular velocity sensor. An output of the angular velocity sensor can be used to detect whether the user is in posture appropriate for blood pressure measurement.

Software Configuration

An example of a software configuration of the measurement device 100 will be described with reference to FIG. 5. In the example of FIG. 5, the measurement device 100 includes an input unit 151, a display control unit 152, an electrocardiogram measurement control unit 153, an electrocardiogram acquisition unit 154, a blood pressure measurement control unit 155, a blood pressure value calculation unit 156, a measurement end detection unit 157, a posture detection unit 158, a notification unit 159, an instruction unit 160, an electrocardiogram storage unit 171, and a blood pressure value storage unit 172. The control unit 101 of the measurement device 100 executes a program stored in the storage unit 105 to cause the input unit 151, the display control unit 152, the electrocardiogram measurement control unit 153, the electrocardiogram acquisition unit 154, the blood pressure measurement control unit 155, the blood pressure value calculation unit 156, the measurement end detection unit 157, the posture detection unit 158, the notification unit 159, and the instruction unit 160 to execute processing described below. When the control unit 101 executes the program, the control unit 101 unfolds the program in the RAM 103. Then, the control unit 101 causes the CPU 102 to interpret and execute the program unfolded in the RAM 103 to control each component. The electrocardiogram storage unit 171 and the blood pressure value storage unit 172 are provided in the storage unit 105.

The input unit 151 receives an input from the user. The input unit 151 receives, from the input device 107, an operation signal corresponding to an operation performed by the user on the input device 107 and determines contents of an instruction input by the user based on the operation signal. The instruction is, for example, an instruction to start electrocardiogram measurement, an instruction to start blood pressure measurement, an instruction to suspend electrocardiogram measurement, an instruction to suspend blood pressure measurement, an instruction to browse a history of measurement results, or the like. For example, in a case where the user instructs the start of electrocardiogram measurement, the input unit 151 gives the electrocardiogram measurement control unit 153 a measurement start instruction signal instructing the start of the measurement. In a case where the user instructs suspension of measurement during blood pressure measurement, the input unit 151 gives the blood pressure measurement control unit 155 a measurement end instruction signal instructing the suspension of the measurement.

The display control unit 152 controls the display device 106 and causes the display device 106 to display information. For example, the display control unit 152 receives a message from the notification unit 159 and causes the display device 106 to display the message. The display control unit 152 receives a message from the instruction unit 160 and causes the display device 106 to display the message. After blood pressure measurement, the display control unit 152 causes the display device 106 to display measurement results of blood pressure.

The electrocardiogram measurement control unit 153 controls an operation associated with electrocardiogram measurement. The electrocardiogram measurement control unit 153 drives the signal processing circuit 133 to perform electrocardiogram measurement. For example, when the electrocardiogram measurement control unit 153 receives a measurement start instruction signal from the input unit 151, the electrocardiogram measurement control unit 153 drives the signal processing circuit 133. The electrocardiogram acquisition unit 154 acquires, as an electrocardiogram, a potential difference signal output from the signal processing circuit 133 by a time series, and stores the electrocardiogram in the electrocardiogram storage unit 171 in association with time information.

The blood pressure measurement control unit 155 controls an operation associated with blood pressure measurement. The blood pressure measurement control unit 155 controls the pump drive circuit 146 and the valve drive circuit 147 to perform blood pressure measurement by the oscillometric method. The blood pressure measurement control unit 155 brings the valve 144 into a closed state via the valve drive circuit 147 and drives the pump 143 via the pump drive circuit 146. Accordingly, supply of air to the pressing cuff 141 starts. The pressing cuff 141 is inflated, and compresses the left wrist of the user. When calculation of a blood pressure value by the blood pressure value calculation unit 156 is completed, the blood pressure measurement control unit 155 stops the pump 143 via the pump drive circuit 146 and brings the valve 144 into an open state via the valve drive circuit 147. Accordingly, air is discharged from the pressing cuff 141. The blood pressure measurement control unit 155 monitors cuff pressure by using the pressure sensor 142. In a case where cuff pressure exceeds an upper pressure limit before the calculation of a blood pressure value by the blood pressure value calculation unit 156 is completed, the blood pressure measurement control unit 155 stops the pump 143 via the pump drive circuit 146 and brings the valve 144 into the open state via the valve drive circuit 147. The upper pressure limit is predetermined from the viewpoint of safety. The upper pressure limit is determined to be 300 mmHg, for example.

In a pressurizing process of supplying air to the pressing cuff 141, the blood pressure value calculation unit 156 calculates a blood pressure value by the oscillometric method based on a pressure signal output from the pressure sensor 142. The blood pressure value includes systolic blood pressure (SBP) and diastolic blood pressure (DBP), but is not limited to these. The blood pressure value calculation unit 156 causes the blood pressure value storage unit 172 to store a calculated blood pressure value in association with time information. The blood pressure value calculation unit 156 can calculate a pulse rate together with a blood pressure value.

The measurement end detection unit 157 detects the end of electrocardiogram measurement. For example, the measurement end detection unit 157 measures time having elapsed since the start of electrocardiogram measurement. The start of electrocardiogram measurement is, for example, timing at which the right hand of the user comes into contact with the electrode 132. The contact of the right hand of the user with the electrode 132 can be detected based on, for example, a potential difference signal output from the signal processing circuit 133. The measurement end detection unit 157 determines the end of electrocardiogram measurement when a predetermined period of time (for example, 30 seconds) has elapsed since the start of electrocardiogram measurement. The measurement end detection unit 157 gives the electrocardiogram measurement control unit 153, the blood pressure measurement control unit 155, the posture detection unit 158, the notification unit 159, and the instruction unit 160 a notification signal notifying of the end of electrocardiogram measurement. When the electrocardiogram measurement control unit 153 receives the notification signal from the measurement end detection unit 157, the electrocardiogram measurement control unit 153 stops the signal processing circuit 133. Accordingly, an electrocardiogram for a predetermined period of time is recorded.

Note that the measurement end detection unit 157 may determine the end of electrocardiogram measurement when the user releases the right hand from the electrode 132 after a predetermined period of time has elapsed since the start of electrocardiogram measurement. In this case, the measurement end detection unit 157 may notify the user that a predetermined period of time has elapsed since the start of electrocardiogram measurement. Additionally, when the measurement end detection unit 157 detects the end of electrocardiogram measurement, the measurement end detection unit 157 may give the notification signal to the blood pressure measurement control unit 155, the posture detection unit 158, the notification unit 159, and the instruction unit 160, and when the user releases the right hand from the electrode 132, the measurement end detection unit 157 may provide the notification signal to the electrocardiogram measurement control unit 153. In these cases, an electrocardiogram for a period of time from the contact of the right hand of the user with the electrode 132 to the release of the right hand from the electrode 132 is recorded.

The posture detection unit 158 detects, based on the acceleration signal output from the acceleration sensor 108, that the user is in posture appropriate for blood pressure measurement. The posture appropriate for blood pressure measurement is, for example, posture as illustrated in FIG. 6 in which the left wrist that is a target measurement site is at the same height as the height of a heart. As described above, in the attachment state, the body 123 is positioned in the surface of the back side of the left wrist. Thus, whether the user is in posture appropriate for blood pressure measurement can be determined by detecting movement or inclination of the body 123 of the measurement device 100 based on the acceleration signal. Again with reference to FIG. 5, when the posture detection unit 158 detects that the user is in posture appropriate for blood pressure measurement, the posture detection unit 158 gives the blood pressure measurement control unit 155 and the instruction unit 160 a detection signal representing that the user is in posture appropriate for blood pressure measurement. When the blood pressure measurement control unit 155 receives the detection signal from the posture detection unit 158, the blood pressure measurement control unit 155 starts blood pressure measurement. In other words, the blood pressure measurement control unit 155 starts blood pressure measurement in response to the measurement end detection unit 157 that has detected the end of electrocardiogram measurement and in response to the posture detection unit 158 that has detected that the user is in posture appropriate for blood pressure measurement.

Generally, it is known that a measurement value of blood pressure deviates from an original value in accordance with a difference in the height between the heart and the target measurement site (the left wrist in this example). For example, in a case where the height of the target measurement site relative to the heart as a reference is 10 cm, a blood pressure difference of approximately 8 mmHg occurs. No blood pressure difference occurs in the measurement performed in posture in which the left wrist is at the same height as the height of the heart, and thus a highly reliable measurement value can be obtained.

In response to the measurement end detection unit 157 that has detected the end of electrocardiogram measurement, the notification unit 159 notifies the user that blood pressure measurement is to be performed. The notification unit 159, for example, emits alert sound via the speaker 109, and also causes the display device 106 to display a message "Electrocardiogram measurement has ended. Next, blood pressure measurement will start." The notification unit 159 gives a message to the display control unit 152, and the display control unit 152 causes the display device 106 to display the message. The message may be voice-synthesized and may be output via the speaker 109.

When the posture detection unit 158 does not detect that the user is in posture appropriate for blood pressure measurement, before a predetermined period of time (for example, 15 seconds) has elapsed since the end of electrocardiogram measurement, the instruction unit 160 instructs the user to assume posture appropriate for blood pressure measurement. The instruction unit 160 receives a notification signal from the measurement end detection unit 157, and measures time having elapsed since the end of electrocardiogram measurement. In a case where the instruction unit 160 does not receive a detection signal from the posture detection unit 158 before the predetermined period of time has elapsed since the end of electrocardiogram measurement, the instruction unit 160 instructs the user. The instruction unit 160, for example, emits alert sound via the speaker 109, and also causes the display device 106 to display a message "Assume posture for blood pressure measurement". The instruction unit 160 gives a message to the display control unit 152, and the display control unit 152 causes the display device 106 to display the message. The message may be voice-synthesized and may be output via the speaker 109.

Note that, in the present embodiment, the example where any of functions of the measurement device 100 is realized by a general-purpose processor is described. However, a portion or all of the functions may be realized by one or more dedicated processors.

Operation Example

Measurement of Electrocardiogram and Blood Pressure

FIG. 7 illustrates an operation flow performed when the measurement device 100 performs blood pressure measurement after electrocardiogram measurement.

At step S11 of FIG. 7, the control unit 101 of the measurement device 100 measures an electrocardiogram of the user. For example, when the user instructs the start of electrocardiogram measurement through the input device 107, the control unit 101 operates as the electrocardiogram measurement control unit 153 to drive the signal processing circuit 133. At this time, the control unit 101 may operate as the display control unit 152 to cause the display device 106 to display a message that prompts the user to touch the electrode with the right hand. Then, the control unit 101 operates as the electrocardiogram acquisition unit 154, and acquires, as an electrocardiogram, a potential difference signal based on a potential difference between the electrode 131 and the electrode 132 and output from the signal processing circuit 133 by a time series.

At step S12, the control unit 101 operates as the measurement end detection unit 157 to detect the end of the measurement of the electrocardiogram. For example, when a predetermined period of time (for example, 30 seconds) has elapsed since the start of electrocardiogram measurement, the control unit 101 determines the end of electrocardiogram measurement, and then stops the signal processing circuit 133.

At step S13, the control unit 101 operates as the notification unit 159 to notify the user that blood pressure measurement is to be performed. For example, the control unit 101 emits alert sound via the speaker 109 and/or causes the display device 106 to display a message representing that blood pressure measurement is to be performed.

At step S14, the control unit 101 operates as the posture detection unit 158 and determines whether the user is in posture appropriate for blood pressure measurement. In a case where the user does not assume posture appropriate for blood pressure measurement before a predetermined period of time (for example, 15 seconds) has elapsed since the end of electrocardiogram measurement, the processing proceeds to step S15. At step S15, the control unit 101 operates as the instruction unit 160 to instruct the user to assume posture appropriate for blood pressure measurement. For example, the control unit 101 emits alert sound through the speaker 109, and also causes the display device 106 to display a message that prompts the user to assume posture appropriate for blood pressure measurement.

At step S16, the control unit 101 operates as the posture detection unit 158 to determine whether the user is in posture appropriate for blood pressure measurement. In a case where the user does not assume posture appropriate for blood pressure measurement before a predetermined period of time (for example, 10 seconds) has elapsed since the notification, the processing ends without performing blood pressure measurement.

In a case where, at step S14 or S16, the control unit 101 detects that the user is in posture appropriate for blood pressure measurement, the processing proceeds to step S17. At step S17, the control unit 101 operates as the blood pressure measurement control unit 155 and the blood pressure value calculation unit 156 to measure blood pressure of the user. The blood pressure measurement will be described below with reference to FIG. 8.

In this way, the measurement device 100 executes blood pressure measurement after electrocardiogram measurement.

Blood Pressure Measurement by Oscillometric Method

FIG. 8 illustrates an operation flow performed when the measurement device 100 performs blood pressure measurement by the oscillometric method. The control unit 101 starts blood pressure measurement by the oscillometric method in response to, for example, the user taking posture appropriate for blood pressure measurement or in response to the user instructing the start of blood pressure measurement via the input device 107.

At step S21 of FIG. 8, the control unit 101 operates as the blood pressure measurement control unit 155 to perform initialization for blood pressure measurement. For example, the control unit 101 initializes a memory region for processing. Further, the control unit 101 opens the valve 144 via the valve drive circuit 147. Accordingly, air inside the pressing cuff 141 is discharged. Subsequently, the control unit 101 sets a current output value of the pressure sensor 142 as a reference value for cuff pressure.

At step S22, the control unit 101 operates as the blood pressure measurement control unit 151 to perform control of pressurizing the pressing cuff 141. For example, the control unit 101 closes the valve 144 via the valve drive circuit 147 and drives the pump 143 via the pump drive circuit 146. Accordingly, air is supplied to the pressing cuff 141 to inflate the pressing cuff 141, and also cuff pressure Pc gradually increases as illustrated in FIG. 9. The control unit 101 monitors the cuff pressure Pc by the pressure sensor 142 and acquires a pulse wave signal Pm representing a variable component of arterial volume.

At step S23 of FIG. 8, the control unit 101 operates as the blood pressure value calculation unit 156 and attempts to calculate a blood pressure value (systolic blood pressure and diastolic blood pressure) based on the pulse wave signal Pm acquired at this point of time. In a case where a blood pressure value cannot be calculated yet due to lack of data at this point of time (No at step S24), the processing at steps S22 and S24 is repeated as long as the cuff pressure Pc does not reach an upper pressure limit.

When a blood pressure value can be calculated (Yes at step S24), at step S25, the control unit 101 operates as the blood pressure measurement control unit 155, stops the pump 143 via the pump drive circuit 146, and opens the valve 144 via the valve drive circuit 147. Accordingly, air inside the pressing cuff 141 is discharged. At step S26, the control unit 101 causes the display device 106 to display blood pressure measurement results and also records the blood pressure measurement results in the storage unit 105.

Note that the processing procedure illustrated in FIG. 7 or FIG. 8 is merely an example and the processing procedure can be changed appropriately. For example, in a case where, at step S15 of FIG. 7, the user does not assume posture appropriate for blood pressure measurement before a predetermined period of time has elapsed since the instruction, the control unit 101 may instruct again. Even in a case where, at step S14 or S16, the user does not assume posture appropriate for blood pressure measurement, the control unit 101 may measure blood pressure of the user. In this case, for example, the control unit 101 may add, to the blood pressure measurement results, information representing that the user has not been in posture appropriate for blood pressure measurement. Additionally, the calculation of a blood pressure value is executed in the pressurizing process in which air is supplied to the pressing cuff 141, but may be executed in the depressurizing process in which air inside the pressing cuff 141 is discharged.

Effects

The measurement device 100 according to the first embodiment determines whether electrocardiogram measurement has ended, and in a case where it is determined that electrocardiogram measurement has ended, the measurement device 100 determines whether the user is in posture appropriate for blood pressure measurement, and in a case where it is determined that the user is in posture appropriate for blood pressure measurement, the measurement device 100 performs blood pressure measurement. Thus, blood pressure measurement is performed after the end of electrocardiogram measurement without the user instructing the start of blood pressure measurement. Accordingly, the user can be prevented from forgetting to measure blood pressure after electrocardiogram measurement. Further, since an electrocardiograph and a blood pressure monitor are integrated, both an electrocardiogram and blood pressure can be measured simply by attaching one device, and this is highly convenient for the user. Since blood pressure measurement is performed in a state where the user is in posture appropriate for blood pressure measurement, reliability of a blood pressure measurement value is very high.

In response to the end of electrocardiogram measurement, the measurement device 100 notifies the user that blood pressure measurement is to be performed. Accordingly, the user can recognize the start of blood pressure measurement to assume posture appropriate for blood pressure measurement. When the user does not assume posture appropriate for blood pressure measurement after the notification, the measurement device 100 instructs the user to assume posture appropriate for blood pressure measurement. Accordingly, the user can perform blood pressure measurement in posture appropriate for blood pressure measurement. As a result, a highly reliable blood pressure measurement value can be obtained.

Second Embodiment

Configuration Example

Hardware Configuration

A measurement device according to the second embodiment can include a hardware configuration similar to the hardware configuration of the measurement device 100 according to the first embodiment (illustrated in FIGS. 2 to 4). Specifically, the measurement device according to the second embodiment includes a control unit 101 including a CPU 102, a RAM 103, a ROM 104, and the like, a storage unit 105, a display device 106, an input device 107, an acceleration sensor 108, a speaker 109, a communication interface 110, a battery 111, a belt portion 120, an electrode 131, an electrode 132, a signal processing circuit 133, a pressure sensor 142, a pump 143, a valve 144, an oscillation circuit 145, a pump drive circuit 146, and a valve drive circuit 147. These components are described above with reference to FIGS. 2 to 4, and thus description of the components will be omitted.

Software Configuration

An example of a software configuration of a measurement device 200 according to the second embodiment will be described with reference to FIG. 10. In the example of FIG. 10, the measurement device 200 includes an input unit 251, a display control unit 252, an electrocardiogram measurement control unit 253, an electrocardiogram acquisition unit 254, a blood pressure measurement control unit 255, a blood pressure value calculation unit 256, a measurement end detection unit 257, a posture detection unit 258, a notification unit 259, an instruction unit 260, a contact detection unit 261, an electrocardiogram storage unit 271, and a blood pressure value storage unit 272. The control unit 101 of the measurement device 200 executes a program stored in the storage unit 105 to cause the input unit 251, the display control unit 252, the electrocardiogram measurement control unit 253, the electrocardiogram acquisition unit 254, the blood pressure measurement control unit 255, the blood pressure value calculation unit 256, the measurement end detection unit 257, the posture detection unit 258, the notification unit 259, the instruction unit 260, and the contact detection unit 261 to execute processing described below. When the control unit 101 executes the program, the control unit 101 unfolds the program in the RAM 103. Then, the control unit 101 causes the CPU 102 to interpret and execute the program unfolded in the RAM 103 to control each component. The electrocardiogram storage unit 271 and the blood pressure value storage unit 272 are realized by the storage unit 105.

The input unit 251 receives an input from a user. For example, in a case where the user instructs the start of blood pressure measurement by operating the input device 107, the input unit 251 gives a measurement start instruction signal to the blood pressure measurement control unit 255 and the posture detection unit 258. In a case where the user instructs suspension of measurement during electrocardiogram measurement, the input unit 251 gives a measurement end instruction signal to the electrocardiogram measurement control unit 253.

The display control unit 252 controls the display device 106. For example, the display control unit 252 receives a message from the notification unit 259 and causes the display device 106 to display the message. The display control unit 252 receives a message from the instruction unit 260 and causes the display device 106 to display the message. After blood pressure measurement, the display control unit 252 causes the display device 106 to display blood pressure measurement results.

The electrocardiogram measurement control unit 253 controls an operation associated with electrocardiogram measurement. The electrocardiogram measurement control unit 253 drives the signal processing circuit 133 to perform electrocardiogram measurement. The electrocardiogram acquisition unit 254 acquires, as an electrocardiogram, a potential difference signal output from the signal processing circuit 133 by a time series, and stores the electrocardiogram in the electrocardiogram storage unit 271 in association with time information.

As with the posture detection unit 158 (FIG. 5) of the first embodiment, the posture detection unit 258 detects that the user is in posture appropriate for blood pressure measurement. When the posture detection unit 258 detects that the user is in posture appropriate for blood pressure measurement, the posture detection unit 258 gives the blood pressure measurement control unit 255 a detection signal representing that the user is in posture appropriate for blood pressure measurement.

The blood pressure measurement control unit 255 controls an operation associated with blood pressure measurement. The blood pressure measurement control unit 255 controls the pump drive circuit 146 and the valve drive circuit 147 to perform blood pressure measurement by the oscillometric method. For example, when the blood pressure measurement control unit 255 receives a measurement start instruction signal from the input unit 251, the blood pressure measurement control unit 255 starts blood pressure measurement. Specifically, the blood pressure measurement control unit 255 performs initialization for blood pressure measurement. Then, when the blood pressure measurement control unit 255 receives the detection signal from the posture detection unit 258, the blood pressure measurement control unit 255 brings the valve 144 into a closed state via the valve drive circuit 147 and drives the pump 143 via the pump drive circuit 146. As with the blood pressure measurement control unit 155 (FIG. 5) of the first embodiment, the blood pressure measurement control unit 255 performs blood pressure measurement. Thus, specific description of blood pressure measurement will be omitted. The blood pressure value calculation unit 256 calculates a blood pressure value by a method similar to the method of the blood pressure value calculation unit 156 (FIG. 5) of the first embodiment, and causes the blood pressure value storage unit 272 to store a calculated blood pressure value in association with time information.

The measurement end detection unit 257 detects the end of blood pressure measurement. For example, when cuff pressure becomes below a pressure threshold (for example, 10 mmHg) after the blood pressure value calculation unit 256 calculates a blood pressure value, the measurement end detection unit 257 determines the end of blood pressure measurement. When the blood pressure value calculation unit 256 can calculate a blood pressure value, the measurement end detection unit 257 may determine the end of blood pressure measurement. The measurement end detection unit 257 gives the electrocardiogram measurement control unit 253, the notification unit 259, the instruction unit 260, and the contact detection unit 261 a notification signal notifying the end of blood pressure measurement. When the electrocardiogram measurement control unit 253 receives the notification signal from the measurement end detection unit 257, the electrocardiogram measurement control unit 253 drives the signal processing circuit 133.

When the notification unit 259 receives the notification signal from the measurement end detection unit 257, that is, in response to the measurement end detection unit 257 that has detected the end of blood pressure measurement, the notification unit 259 notifies the user that electrocardiogram measurement is to be performed. The notification unit 259, for example, emits alert sound via the speaker 109, and also causes the display device 106 to display a message "Blood pressure measurement has ended. Next, electrocardiogram measurement will start." The notification unit 259 gives a message to the display control unit 252, and the display control unit 252 causes the display device 106 to display the message. The message may be voice-synthesized and may be output via the speaker 109.

The contact detection unit 261 detects contact of the user (specifically, a right hand of the user) with the electrode 132. The contact of the user with the electrode 132 can be detected based on, for example, a potential difference signal output from the signal processing circuit 133. The contact detection unit 261 gives the electrocardiogram measurement control unit 253 and the instruction unit 260 a detection signal representing the contact of the user with the electrode 132.

When the contact detection unit 261 does not detect the contact of the user with the electrode 132 before a predetermined period of time (15 seconds, for example) has elapsed since the detection of the end of blood pressure measurement by the measurement end detection unit 257, the instruction unit 260 instructs the user to touch the electrode 132 with the right hand. The instruction unit 260 receives a notification signal from the measurement end detection unit 257, and measures time having elapsed since the end of electrocardiogram measurement. In a case where the instruction unit 260 does not receive the detection signal from the contact detection unit 261 before a predetermined period of time has elapsed since the end of blood pressure measurement, the instruction unit 260 instructs the user. The instruction unit 260, for example, emits alert sound via the speaker 109, and also causes the display device 106 to display a message "Touch electrode with right hand finger." Specifically, the instruction unit 260 gives a message to the display control unit 252, and the display control unit 252 causes the display device 106 to display the message. The message may be voice-synthesized and may be output via the speaker 109.

Note that, in the present embodiment, the example where any of functions of the measurement device 200 is realized by a general-purpose processor. However, a portion or all of the functions may be realized by one or more dedicated processors.

Operation Example

FIG. 11 illustrates an operation flow performed when the measurement device 200 performs electrocardiogram measurement after blood pressure measurement.

At step S31 of FIG. 11, the control unit 101 of the measurement device 200 measures blood pressure of the user. For example, when the user instructs the start of measurement through the input device 107, the control unit 101 operates as the posture detection unit 158 to determine whether the user is in posture appropriate for blood pressure measurement. When the user takes posture appropriate for blood pressure measurement, the control unit 101 operates as the blood pressure measurement control unit 255 to control the pump drive circuit 146 and the valve drive circuit 147 to perform blood pressure measurement by the oscillometric method.

At step S32, the control unit 101 operates as the measurement end detection unit 257 to detect the end of blood pressure measurement. For example, after the control unit 101 calculates a blood pressure value, the control unit 101 stops the pump 143 via the pump drive circuit 146 and opens the valve 144 via the valve drive circuit 147. Accordingly, air is discharged from a pressing cuff 141. When cuff pressure becomes below a pressure threshold (for example, 10 mmHg), the control unit 101 determines the end of blood pressure measurement.

At step S33, the control unit 101 operates as the notification unit 259 to notify the user that electrocardiogram measurement is to be performed. For example, the control unit 101 emits alert sound via the speaker 109 and/or causes the display device 106 to display a message representing that electrocardiogram measurement is to be performed. At step S34, the control unit 101 operates as the electrocardiogram measurement control unit 253 to drive the signal processing circuit 133.

At step S35, the control unit 101 operates as the contact detection unit 261 to determine whether the right hand of the user has come into contact with the electrode 132. In a case where the right hand of the user does not come into contact with the electrode 132 before a predetermined period of time (for example, 15 seconds) has elapsed since the end of blood pressure measurement, the processing proceeds to step S36. At step S36, the control unit 101 operates as the instruction unit 260 to instruct the user to touch the electrode 132 with the right hand. For example, the control unit 101 emits alert sound through the speaker and also causes the display device 106 to display a message prompting the user to touch the electrode 132 with the right hand.

At step S37, the control unit 101 operates as the contact detection unit 261 to determine whether the right hand of the user has come into contact with the electrode 132. In a case where the right hand of the user does not come into contact with the electrode 132 before a predetermined period of time (for example, 10 seconds) has elapsed since the notification, the processing proceeds to step S39. At step S39, the control unit 101 operates as the electrocardiogram measurement control unit 253 to stop the signal processing circuit 133. In this case, the processing ends without performing electrocardiogram measurement.

In a case where, at step S35 or S37, the control unit 101 detects the contact of the right hand of the user with the electrode 132, the processing proceeds to step S38. At step S38, the control unit 101 operates as the electrocardiogram acquisition unit 254 to acquire an electrocardiogram of the user. After measurement of an electrocardiogram is performed for a predetermined period of time (for example, 30 seconds), at step S39, the control unit 101 operates as the electrocardiogram measurement control unit 253 to stop the signal processing circuit 133.

In this way, the measurement device 200 executes blood pressure measurement after electrocardiogram measurement.

Note that the processing procedure illustrated in FIG. 11 is merely an example and the processing procedure can be changed appropriately. For example, in a case where the right hand of the user does not come into contact with the electrode 132 before a predetermined period of time has elapsed since the notification at step S36 of FIG. 11, the control unit 101 may notify again. The processing at step S34 may be executed before the processing at step S33.

Effects

The measurement device 200 according to the second embodiment determines whether blood pressure measurement has ended, and in a case where it is determined that blood pressure measurement has ended, the measurement device 200 performs electrocardiogram measurement. Thus, electrocardiogram measurement is performed after the end of blood pressure measurement without the user instructing the start of electrocardiogram measurement. Accordingly, the user can be prevented from forgetting to perform electrocardiogram measurement after blood pressure measurement. Further, since an electrocardiograph and a blood pressure monitor are integrated, both an electrocardiogram and blood pressure can be measured simply by attaching one device, and this is highly convenient for the user.

In response to the end of blood pressure measurement, the measurement device 200 notifies the user that electrocardiogram measurement is to be performed. Accordingly, the user can recognize the start of electrocardiogram measurement to touch the electrode 132 with the right hand. When the user does not touch the electrode 132 after the notification, the measurement device 200 instructs the user to touch the electrode 132 with the right hand. Accordingly, electrocardiogram measurement can be performed more securely.

Modified Examples

Note that the invention is not limited to the embodiments described above.

For example, in the measurement device 100 according to the first embodiment, the posture detection unit 158 may be removed. In a case where the posture detection unit 158 is removed, the blood pressure measurement control unit 155 starts blood pressure measurement in response to the measurement end detection unit 157 that has detected the end of electrocardiogram measurement. The measurement device 100 may further include a height detection unit that detects the height of a target measurement site relative to a heart as a reference, and a blood pressure measurement value may be corrected based on the height detected by the height detection unit. Additionally, after the user has taken posture appropriate for blood pressure measurement, the user may also press a button for starting blood pressure measurement. Similarly, in the measurement device 200 according to the second embodiment, the posture detection unit 258 may be removed.

The target measurement site is not limited to a wrist. The target measurement site may be any site in an upper limb such as an upper arm. The upper arm is positioned at approximately the same height as the height of the heart. Thus, in a case where the target measurement site is the upper arm, the user need not take such posture as illustrated in FIG. 6 during blood pressure measurement. Thus, in the measurement device 100 according to the first embodiment, the posture detection unit 158, the notification unit 159, and the instruction unit 160 may be removed. Further, there is also no need to correct a blood pressure measurement value.

In short, the present invention is not limited to the embodiments described above as they are, and the component can be modified and embodied without departing from the gist of the present invention in a practical phase. Additionally, various inventions can be formed by appropriately combining a plurality of components disclosed in the embodiments described above. For example, some components may be omitted from all the components described in the embodiments. Further, the components of the different embodiments may be combined appropriately.

Supplementary Notes

A portion or all of the embodiments can be described as described in the following supplementary notes in addition to the scope of the claims, but is not limited to the supplementary notes.

Supplementary Note 1

A measurement device (10) including
an electrocardiogram measurement unit (30) configured to measure an electrocardiogram reading of a user,
a blood pressure measurement unit (40) configured to measure blood pressure of the user,
a measurement end detection unit (50) configured to detect an end of electrocardiogram measurement by the electrocardiogram measurement unit, and a blood pressure measurement control unit (60) configured to start blood pressure measurement by the blood pressure measurement unit in response to the measurement end detection unit that has detected the end of the electrocardiogram measurement.

Supplementary Note 2

A measurement device (200) including
an electrocardiogram measurement unit (30) configured to measure an electrocardiogram reading of a user,
a blood pressure measurement unit (40) configured to measure blood pressure of the user,
a measurement end detection unit (257) configured to detect an end of blood pressure measurement by the blood pressure measurement unit, and
an electrocardiogram measurement control unit (253) configured to start electrocardiogram measurement by the electrocardiogram measurement unit in response to the measurement end detection unit that has detected the end of the blood pressure measurement.

REFERENCE LIST

10 Measurement device
20 Belt portion
21 Outer circumferential surface
30 Electrocardiogram measurement unit
31 Electrode
32 Electrode
33 Electrocardiogram generation unit
40 Blood pressure measurement unit
50 Measurement end detection unit
60 Blood pressure measurement control unit
100 Measurement device
101 Control unit
102 CPU
103 RAM
104 ROM
105 Storage unit
106 Display device
107 Input device
108 Acceleration sensor
109 Speaker
110 Communication interface
111 Battery
120 Belt portion
121 Belt
122 Band-like body
123 Body
124 Three fold buckle
125 First plate-like member
126 Second plate-like member
127, 128 Connecting rod
129 Fixing portion
131 Electrode
132 Electrode
133 Signal processing circuit
134 Instrumentation amplifier
135 Low pass filter
136 Amplifier
137 Analog-to-digital converter
141 Pressing cuff
142 Pressure sensor
143 Pump
144 Valve
145 Oscillation circuit
146 Pump drive circuit
147 Valve drive circuit
148, 149 Pipe
151 Input unit
152 Display control unit
153 Electrocardiogram measurement control unit
154 Electrocardiogram acquisition unit
155 Blood pressure measurement control unit
156 Blood pressure value calculation unit
157 Measurement end detection unit
158 Posture detection unit
159 Notification unit
160 Instruction unit
171 Electrocardiogram storage unit
172 Blood pressure value storage unit
200 Measurement device
251 Input unit
252 Display control unit
253 Electrocardiogram measurement control unit
254 Electrocardiogram acquisition unit
255 Blood pressure measurement control unit
256 Blood pressure value calculation unit
257 Measurement end detection unit
258 Posture detection unit
259 Notification unit
260 Instruction unit
261 Contact detection unit
271 Electrocardiogram storage unit
272 Blood pressure value storage unit

The invention claimed is:

1. A measurement device comprising:
an electrocardiogram measurement unit including a first electrode, a second electrode and a circuit, the circuit being configured to generate a potential difference signal indicating a potential difference between the first electrode and the second electrode, and measure an electrocardiogram reading of a user based on the potential difference signal;
a blood pressure measurement unit including a cuff configured to press a measurement side of the user based on a supply of fluid and a pressure sensor configured to detect pressure inside the cuff, the blood pressure measurement unit being configured to measure blood pressure of the user based on an output of the pressure sensor; and
a processor configured to:
detect an end of an electrocardiogram measurement by the electrocardiogram measurement unit, the detecting of the end of the electrocardiogram measurement comprising determining the end of the electrocardiogram measurement when a predetermined period of time has elapsed since a start of the electrocardiogram measurement and stopping the electrocardiogram measurement by the electrocardiogram measurement unit;
output a message notifying that a blood pressure measurement is to be performed, in response to a detection of the end of the electrocardiogram measurement; and
start the blood pressure measurement by the blood pressure measurement unit in response to the detection of the end of the electrocardiogram measurement.

2. The measurement device according to claim 1,
wherein the processor is further configured to detect that the user is in a posture appropriate for the blood pressure measurement, and
wherein the processor starts the blood pressure measurement in response to the detection of the end of the electrocardiogram measurement and a detection of the user being in the posture appropriate for the blood pressure measurement.

3. The measurement device according to claim 2, wherein the processor is further configured to instruct the user to assume the posture appropriate for the blood pressure measurement, when the processor does not detect that the user is in the posture appropriate for the blood pressure measurement, before a predetermined period of time has elapsed since the end of the electrocardiogram measurement.

4. A measurement device comprising:
an electrocardiogram measurement unit including a first electrode, a second electrode and a circuit, the circuit being configured to generate a potential difference signal indicating a potential difference between the first electrode and the second electrode, and measure an electrocardiogram reading of a user based on the potential difference signal;
a blood pressure measurement unit including a cuff configured to press a measurement side of the user based on a supply of fluid and a pressure sensor configured to detect pressure inside the cuff, the blood pressure measurement unit being configured to measure blood pressure of the user based on an output of the pressure sensor to obtain a measurement value of the blood pressure of the user; and
a processor configured to:
detect an end of a blood pressure measurement by the blood pressure measurement unit, the detecting of the end of the blood pressure measurement comprising stopping the supply of fluid to the cuff and determining the end of the blood pressure measurement when the pressure inside the cuff becomes below a predetermined threshold after the measurement value is obtained;
output a message notifying that an electrocardiogram measurement is to be performed, in response to a detection of the end of the blood pressure measurement; and
start the electrocardiogram measurement by the electrocardiogram measurement unit in response to the detection of the end of the blood pressure measurement.

5. The measurement device according to claim 4, further comprising an attachment member configured to be attached to the user, wherein
the first electrode is provided in a surface of a side that comes into contact with the user of the attachment member,
the second electrode is provided in a surface of a side that does not come into contact with the user of the attachment member, and
the processor is further configured to:
detect contact of the user with the second electrode; and
instruct the user to come into contact with the second electrode, when the processor does not detect the contact of the user with the second electrode, before a predetermined time period has elapsed since the end of the blood pressure measurement.

6. The measurement device according claim 1, wherein the start of the electrocardiogram measurement is when the user contacts one of the first electrode or the second electrode.

* * * * *